3,347,841
METHOD OF PREPARING POLYOLEFINS
Leo E. Rademacher, Springfield, Mass., assignor to Monsanto Company, St. Louis, Mo., a corporation of Delaware
No Drawing. Filed Aug. 27, 1964, Ser. No. 392,629
7 Claims. (Cl. 260—94.9)

The present invention relates to a new and useful method of preparing powdered polyolefins and more particularly to a method of preparing polyolefins by contacting the polymer with a vinyl halide monomer, heating the resultant mixture and recovering the polyolefin in finely divided form.

Various processes have been proposed in the past for the treatment of solid polymers such as polyethylene to form a finely divided or powdered material. For example, one process which has been proposed provides for dissolving a solid polyethylene in a low boiling organic material at high pressure and high temperature, thereafter reducing the pressure and temperature through a relief valve in a series of steps, and recovering powdered polyethylene from a large pressure vessel. A process has also been suggested which involves producing powdered polyethylene directly from a tubular reaction zone operated at high pressures and temperatures. Finally, processes in which a polymer is dissolved in a gasoline or in an alcohol have been suggested.

Each of these processes has involved either expensive and time consuming operations, extremely high pressures and temperatures, or have introduced undesirable impurities into the finely divided polymer. These undesirable impurities present severe problems when attempting to produce polyethylene-polyvinyl halide blends or graft copolymers since the impurities impair grafting efficiency, and in addition, often require elaborate purification procedures when the resultant graft copolymers or blends are to be used in food containers or the like where stringent purity requirements are necessary.

It is therefore an object of this invention to provide a process for producing finely divided polyolefins which obviates all these disadvantages mentioned above.

It is a further object of this invention to provide an improved method for the preparation of finely divided polyethylene which includes the steps of heating a mixture of a vinyl halide monomer with a polyolefin, separating the vinyl halide monomer, and recovering the polyolefin in finely divided form.

It is a further object of this invention to provide a finely divided polyethylene which is particularly adapted for preparing polyblends with polyvinyl chloride, or in preparing ethylene-polyvinyl chloride graft copolymers.

These and other objects of the invention will become apparent from the following description.

Each of the above objects has been realized through the development of a novel process wherein polyolefins of the ethylene series are mixed with a vinyl halide monomer, the resultant mixture is heated and cooled and, thereafter, the vinyl chloride monomer is vented off by evaporation, filtration, centrifugation, or other separation methods, leaving a polyolefin having an average particle size of between 10 and 200 microns. Although the polyolefin particles are generally uniform in size and shape, the particular size of the particles may be varied over a wide range by varying the process conditions. The ultimate size of the polyolefin particle will depend upon the specific end use intended.

The finely divided polymers which are useful in the practice of this invention are those prepared by polymerization of an olefin of the ethylene series. The term "ethylene series" as used herein is intended to include unsaturated hydrocarbons with the general formula $C_nH_{2n}$ which contain at least one double bond. Optimum results are obtained when $n$ is between 2 and 8. More specifically the term "ethylene series" is intended to include ethylene, propylene, butylene, amylene, hexylene, heptylene, octylene, and their isomers. Polyethylene is by far the preferred polyolefin used in the practice of this invention. Generally polyethylenes having melt indices between 0.1–40, preferably between 0.4–25, and having densities of 0.91–0.93 g./cc. have been found to be the most suitable in the practice of this invention.

The term vinyl halide as used herein includes vinyl chloride, vinyl bromide, or vinyl fluoride. Vinyl chloride has been found to be the most useful of the vinyl halide monomers in the practice of this invention. Small amounts of other ethylenically unsaturated monomers may be present if desired, such as, for example, vinyl acetate, vinyl butyrate, styrene, methyl acrylate, butyl acrylate, allyl chloride, methallyl acetate, methyl vinyl ketone, and the like.

The following examples are presented to illustrate the novel features of this invention but are not to be construed as limiting the invention in any manner.

*Example I*

A mixture of 100 grams of pelleted polyethylene having a density of 0.92 g./cc. and a melt index of 3, as measured by ASTM No. D1238–57T, together with 300 grams of vinyl chloride monomer was placed in a closed container capable of containing the mixture at pressures of about 300 p.s.i.g., and heated in a bath at 95° C. for one hour while continuously agitating the container, end over end, at 35 r.p.m. during the hour. The bomb was thereafter cooled to 30° C. in 10 minutes and then to −20° C. during 1 hour, after which the vinyl chloride monomer was evaporated and recovered. The polyethylene recovered was in the form of generally spherical particles having an average particle size of between 20–40 microns.

*Example II*

Example I was repeated with a ratio of 50 grams of polyethylene to 400 grams of vinyl chloride monomer in an 850 ml. bomb. The mixture was heated to 100° C. for 45 minutes, during which time the mixture was continuously agitated. After cooling for 10 minutes to 30° C., then to −20° C. during one hour, vinyl chloride monomer was filtered off, leaving a finely divided polyethylene consisting of generally spherical particles having an average particle size of between 10–50 microns.

*Example III*

Example I was repeated using 50 grams of pelleted polyethylene having a density of 0.92 g./cc. and a melt index of 22, and 400 grams of vinyl chloride monomer. The mixture was heated to a temperature of 80° C. for 45 minutes, after which the mixture was cooled for 10 minutes to 30° C. and then to −20° C. The vinyl chloride monomer was evaporated off, leaving a finely divided polyethylene powder consisting of spherical particles having a particle size generally between 50 to 100 microns.

*Example IV*

Example I was repeated using 55 grams of pelleted polyethylene having a density of 0.92 g./cc. and a melt index of 0.4, and 450 grams of vinyl chloride monomer. The mixture was heated to a temperature of 100° C. for 45 minutes, after which the mixture was cooled for 10 minutes to room temperature and then to −20° C. The vinyl chloride monomer was evaporated off, leaving a finely divided polyethylene powder consisting of spherical particles having an average particle size of between 50 to 200 microns.

Example V

Example II was repeated using polypropylene in place of polyethylene. A finely divided polypropylene powder was obtained after removal of the vinyl chloride monomer.

Example VI

Example I was repeated using polyethylene having a density of 0.95 g./cc. and a melt index of 0.2, in place of the polyethylene of Example I, except that the mixture is heated to a temperature of 120° C. A finely divided powder consisting of generally spherical particles was obtained.

The ultimate fineness of the polyethylene powder will depend upon the ratio of polyethylene to vinyl chloride monomer employed, the temperature to which the mixture is heated, the intensity of agitation used, the cooling time, and, to some extent, the particular grade of polyolefin employed. Generally, however, it has been found that polyolefin:vinyl chloride monomer ratios of between 1:20 and 1:2, with optimum ratios ranging between 1:10 and 1:4 are the most suitable for the practice of this invention. Powdering temperatures generally range between 75° C. and 125° C. For polyethylene, powdering temperatures of between 80° C. and 115° C. are most suitable. Low molecular weight, low density polyolefins generally require temperatures in the range of 80–90° C., while high density and/or high molecular weight polyolefins generally require temperatures of 100° C. or higher. Generally, it has been found necessary to maintain the polyolefin:vinyl chloride mixture at these temperatures for at least 10 minutes with best results occurring when the mixture is maintained at these temperatures for about 30 to 60 minutes. Cooling time and the degree of agitation during heating are additional factors which will influence the ultimate particle size of the polyethylene. Reasonably rapid cooling times yield better results than slower cooling times. Preferably the mixture should be cooled within 15 minutes although the cooling time necessary to cool a given amount of monomer-elastomer mixture will vary as any or all of the above factors vary.

It has also been found to be particularly advantageous to agitate the mixture during heating, although the degree of agitation necessary to obtain optimum results will depend upon the particular conditions present within the ranges outlined above.

This particular method of producing finely divided polyolefins offers several unusual advantages over any of the methods previously proposed in the prior art. Since the vinyl halide monomer is particularly volatile, it can be evaporated at temperatures low enough to prevent re-agglomeration of the polyethylene particles and can be recovered and re-used, if desired. In addition, vinyl halide monomers, which are readily available at a reasonable cost, avoid the problems presented when it is necessary to produce a polyethylene powder with a negligible amount of undesirable impurities. This particular factor is extremly important when producing polyolefin-polyvinyl halide blends or graft copolymers. Finally, the process described avoids the necessity of expensive equipment and time consuming operations so common with the presently available methods for producing finely divided polyethylene.

The uniform particle size of the finely divided polyolefin is an obvious advantage. The particles, generally in the shape of spheres, will have ultimate particle sizes in the range of 5–200 microns, depending upon the combination of processing conditions employed. For example, polyethylene prepared by the method of Example I will consist of particles, approximately 95% of which will be within the range of 20–40 microns. In contrast, polyethylene powders prepared by prior art techniques show large differences in particle size and geometry. For example, mechanically ground polyethylene is generally composed of large irregularly shaped solid particles having relatively small amounts of surface area. Other prior art methods produce bulky agglomerates of very small particles or large particles having small amounts of surface area. Accordingly, it can be readily appreciated that the polyethylene powders made in accordance with this invention offer numerous advantages in the manufacture of polyblends of graft copolymers with PVC, in rotation molding, in the production of polyethylene emulsions, etc.

While in the foregoing specification, specific compositions and steps have been set out in considerable detail for the purpose of illustrating the invention, it will be understood that such details of composition and procedure may be varied widely by those skilled in the art without departing from the spirit of this invention.

What is claimed is:

1. A method of preparing a finely divided polyolefin comprising:
    contacting a polyolefin with a vinyl halide monomer, heating the resultant mixture to a temperature between about 75–125° C. in the absence of an initiator, cooling the mixture to a temperature substantially below 75° C. and recovering the polyolefin in finely divided form.

2. A method according to claim 1 wherein said polyolefin is polyethylene having a density of between 0.91–0.93 g./cc. and a melt index of between 0.1–40.

3. A method according to claim 1 wherein said vinyl halide monomer is vinyl chloride.

4. A method according to claim 1 wherein said polyolefin is recovered by venting off the vinyl halide monomer.

5. A method according to claim 2 wherein the recovered polyethylene has an average particle size within the range of 5 to 200 microns.

6. A method according to claim 1 wherein the said polyolefin is polypropylene.

7. A method according to claim 1 wherein said polyolefin is high density polyethylene.

References Cited

UNITED STATES PATENTS

| | | | |
|---|---|---|---|
| 3,090,778 | 5/1963 | Ehrlech et al. | 260—94.9 |
| 3,244,687 | 4/1966 | Spindler et al. | 260—94.9 |

JOSEPH L. SCHOFER, *Primary Examiner.*

LAWRENCE EDELMAN, *Assistant Examiner.*